US012726128B2

(12) United States Patent
Hu et al.

(10) Patent No.: US 12,726,128 B2
(45) Date of Patent: Sep. 1, 2026

(54) PULSE WIDTH MODULATION CONTROL CIRCUIT HAVING DUAL LOOPS

(71) Applicant: Richtek Technology Corporation, Hsinchu (TW)

(72) Inventors: Kai-Yu Hu, Hsinchu (TW); Cheng-Hsuan Fan, Hsinchu (TW); Yung-Jen Chen, Hsinchu (TW); Chien-Hui Wang, Hsinchu (TW)

(73) Assignee: Richtek Technology Corporation, Hsinchu (TW)

( * ) Notice: Subject to any disclaimer, the term of this patent is extended or adjusted under 35 U.S.C. 154(b) by 174 days.

(21) Appl. No.: 18/826,282

(22) Filed: Sep. 6, 2024

(65) Prior Publication Data

US 2025/0183802 A1 Jun. 5, 2025

Related U.S. Application Data

(60) Provisional application No. 63/604,868, filed on Nov. 30, 2023.

(30) Foreign Application Priority Data

Jun. 21, 2024 (TW) ................................ 113123042

(51) Int. Cl.
*H02M 3/158* (2006.01)
*H02M 1/00* (2006.01)
*H02M 3/157* (2006.01)

(52) U.S. Cl.
CPC ....... *H02M 3/1586* (2021.05); *H02M 1/0009* (2021.05); *H02M 1/0032* (2021.05); *H02M 3/157* (2013.01)

(58) Field of Classification Search
CPC .. H02M 3/157; H02M 3/1586; H02M 1/0009; H02M 1/0032
(Continued)

(56) References Cited

U.S. PATENT DOCUMENTS

2008/0224674 A1* 9/2008 Hasegawa ............ H02M 3/158 323/282
2023/0067632 A1* 3/2023 Kotikelapudi ........... H02P 8/34
(Continued)

FOREIGN PATENT DOCUMENTS

EP 3109986 A1 * 12/2016 ........... H02M 3/158
WO WO-2022015366 A1 * 1/2022 ........... H02M 3/157

*Primary Examiner* — Yemane Mehari
(74) *Attorney, Agent, or Firm* — Huan-Yi Lin

(57) ABSTRACT

A pulse width modulation control circuit for controlling a power converter circuit includes: a main loop control circuit; and a light-load loop control circuit. The light-load loop control circuit includes a current synthesis circuit configured to generate a synthesized current signal according to an input voltage and a target value of an output voltage and an inductance value of an inductor in a power stage circuit of the power converter circuit. The light-load loop control circuit generates a pulse modulation signal in light-load mode according to the synthesized current signal, to control a duty ratio of the power stage circuit. In the light-load mode, the main loop control circuit enters a power-saving state to reduce the power consumption of the pulse width modulation control circuit. The power-saving state includes: reducing the power consumption of the current sense circuit or stopping the operation of the current sense circuit.

25 Claims, 15 Drawing Sheets

(58) Field of Classification Search
USPC .......................................................... 323/271
See application file for complete search history.

(56) References Cited

U.S. PATENT DOCUMENTS

2023/0378869 A1* 11/2023 Bafna ................. H02M 1/0009
2025/0357861 A1* 11/2025 Kakade ............... H02M 1/0032

* cited by examiner

PULSE WIDTH MODULATION CONTROL CIRCUIT HAVING DUAL LOOPS

CROSS REFERENCE

The present invention claims priority to the provisional application Ser. No. 63/604,868, filed on Nov. 30, 2023 and claims priority to the TW patent application No. 113123042, filed on Jun. 21, 2024.

BACKGROUND OF THE PRESENT INVENTION

Field of Invention

The present invention relates to a pulse-width modulation (PWM) control circuit, and particularly to a PWM control circuit that has dual-loop and achieves low-power consumption through synthesized current signals.

Description of Related Art

FIG. 1 shows a circuit schematic diagram of a prior art PWM control circuit. This prior art PWM control circuit converts the required sensed signals into digital domain via an analog-to-digital converter (ADC), then performs PWM control through fully digital operations. It uses a digital on-time generator with high time resolution, wherein the start of the on-time is determined by the digital loop and the length of the on-time is also determined by a digital counter. Since the whole control loop is implemented digitally, it requires a very high-frequency clock signal CK0 for multi-phase and high-precision applications. This is particularly true for determining high-resolution conduction times, leading to significant power consumption in the PWM control circuit. Furthermore, when this prior art is expanded for multi-phase applications, it also requires plural phases of ADCs to respectively convert each phase's sensed current, increasing both power consumption and cost.

In view of this, the present invention proposes a dual-loop PWM control circuit with the advantages of both digital and analog domains, which can reduce clock frequency and utilize synthesized current to achieve low power consumption.

SUMMARY OF THE PRESENT INVENTION

In one aspect, the present invention provides a pulse-width modulation (PWM) control circuit for controlling a power conversion circuit, wherein the power conversion circuit includes N power stage circuits, wherein N is an integer greater than or equal to 1. The PWM control circuit includes a main loop control circuit and a light-load loop control circuit. The main loop control circuit includes N current sensing circuits configured to sense N phase currents of the corresponding N power stage circuits to generate N corresponding current sensing signals. The main loop control circuit is configured to generate N corresponding PWM signals in a main loop mode based on the N corresponding current sensing signals to control duty ratios of the N power stage circuits. The light-load loop control circuit includes a current synthesis circuit configured to generate a synthesized current signal based on an input voltage, a target value of an output voltage, and an inductance value of an inductor in at least one of the N power stage circuits. The light-load loop control circuit generates at least one corresponding PWM signal of the N PWM signals in a light-load mode based on the synthesized current signal to control the duty ratio of the corresponding power stage circuit. In the light-load mode, the main loop control circuit enters a power-saving state to reduce the power consumption of the PWM control circuit, which includes reducing the power consumption of the N current sensing circuits or stopping the operation of the N current sensing circuits.

In one preferred embodiment, the power consumption of the current synthesis circuit is less than that of the current sensing circuits.

In one preferred embodiment, in the light-load mode, the synthesized current signal is configured to control the output voltage of the power conversion circuit such that the output voltage varies with a load current according to a predetermined load line.

In one preferred embodiment, in a transition mode for switching from the light-load mode to the main loop mode, the main loop control circuit exits the power-saving state and replaces the corresponding current sensing signals with the synthesized current signal to generate the corresponding PWM signals.

In one preferred embodiment, in the main loop mode, the N current sensing signals are configured to control the output voltage of the power conversion circuit such that the output voltage varies with a load current according to a predetermined load line.

In one preferred embodiment, the main loop mode switches to the light-load mode based on any of the following conditions: when an output current determined by summing all the corresponding N current sensing signals decreases to below a predetermined threshold, or when a switching period of the N PWM signals exceeds the predetermined time for over a predetermined number of times, wherein the PWM control circuit controls the power conversion circuit in a constant on-time control manner. The predetermined number of times is greater than or equal to 1.

In one preferred embodiment, in the light-load mode, the PWM control circuit switches from the light-load mode to the main loop mode based on any of the following conditions: the PWM control circuit receives a command; when an output current of the power conversion circuit exceeds a predetermined level; when the target value of the output voltage changes; or when a rate of change of the output voltage exceeds a predetermined level.

In one preferred embodiment, the PWM control circuit further includes a first analog-to-digital converter configured to convert an output voltage-related signal correlated with the output voltage into a digital output voltage-related signal in digital domain; a second analog-to-digital converter configured to convert a summed current-related signal into a digital summed current-related signal in digital domain, wherein the summed current-related signal is a sum of the N current sensing signals; and N on-time generation circuits configured to time corresponding N constant on-times in analog domain according to triggering of corresponding N trigger signals to generate the corresponding N PWM signals, thereby reducing a frequency of at least one clock signal in the PWM control circuit. The main loop control circuit operates in digital domain based on a first clock signal in the main loop mode, and it generates the N trigger signals based on the digital output voltage-related signal and the digital summed current-related signal. The at least one clock signal includes the first clock signal.

In one preferred embodiment, by timing the N constant on-times in analog domain, the frequency of the first clock signal is reduced.

In one preferred embodiment, the output voltage-related signal is a difference between the output voltage and the target value of the output voltage.

In one preferred embodiment, end times of the N PWM signals are not synchronized with the first clock signal.

In one preferred embodiment, the N current sensing circuits are configured to sense the corresponding N phase currents in analog domain to generate the corresponding N current sensing signals, thereby reducing the frequency of the at least one clock signal.

In one preferred embodiment, when N is an integer greater than or equal to 2, the main loop control circuit further includes a current balancing circuit operating in analog domain. The current balancing circuit is configured to respectively generate corresponding N current balancing signals based on differences between an average value of the summed current-related signal and the N current sensing signals. The N current balancing signals are configured to respectively adjust the corresponding N constant on-times to achieve current balancing among the corresponding N phase currents, thereby reducing the frequency of the at least one clock signal. The power-saving state further includes reducing the power consumption of the current balancing circuit or stopping the operation of the current balancing circuit.

In one preferred embodiment, the transition mode is exited and the main loop mode is entered based on any of the following conditions: after delaying a predetermined transition delay time, or when it is determined that the N current sensing circuits and the current balancing circuit have entered a ready state.

In one preferred embodiment, the light-load loop control circuit further includes a light-load trigger circuit. The synthesized current signal includes a first synthesized current signal. In the light-load mode, the current synthesis circuit generates the first synthesized current signal in digital domain, based on a second clock signal, according to at least one of the N constant on-times, and the light-load trigger circuit generates the corresponding trigger signal in digital domain, based on the second clock signal, according to the digital output voltage-related signal and the first synthesized current signal. The at least one clock signal includes the second clock signal.

In one preferred embodiment, a frequency of the second clock signal is lower than that of the first clock signal, thereby reducing the power consumption of the PWM control circuit in the power-saving state.

In one preferred embodiment, the synthesized current signal further includes a second synthesized current signal. In the transition mode, the current synthesis circuit generates the second synthesized current signal in digital domain based on the first clock signal, and in the transition mode, the main loop control circuit generates the N trigger signals, based on the first clock signal, according to the digital output voltage-related signal and the second synthesized current signal replacing the digital summed current-related signal.

In one preferred embodiment, the second synthesized current signal is updated based on a period of the first clock signal to emulate the corresponding N phase currents in real time or emulate the sum of the N current sensing signals in real time.

In one preferred embodiment, when N is an integer greater than or equal to 2, the second synthesized current signal includes corresponding N sub-synthesized current signals. The main loop control circuit includes a second current balancing circuit. The second current balancing circuit operates in digital domain and is configured to respectively generate corresponding N current balancing signals based on differences between an average value of a sum of the second synthesized current signals and the N sub-synthesized current signals in digital domain in the transition mode. The N current balancing signals are configured to adjust the corresponding N constant on-times to achieve current balancing among the corresponding N phase currents.

In one preferred embodiment, the first synthesized current signal is updated based on a period of the second clock signal to emulate an average value of the corresponding phase current.

In one preferred embodiment, the power-saving state further includes reducing the power consumption of a main trigger circuit of the main loop control circuit or stopping the operation of the main trigger circuit, wherein the main trigger circuit is configured to generate the N trigger signals.

In another aspect, the present invention provides pulse-width modulation (PWM) control circuit for controlling a power conversion circuit, wherein the power conversion circuit includes N power stage circuits, where N is an integer greater than or equal to 1. The PWM control circuit includes a loop control circuit; a first analog-to-digital converter configured to convert an output voltage-related signal correlated with an output voltage into a digital output voltage-related signal in digital domain; a second analog-to-digital converter configured to convert a summed current-related signal into a digital summed current-related signal in digital domain, wherein the summed current-related signal is a sum of N current sensing signals; and N on-time generation circuits configured to time corresponding N constant on-times in analog domain according to triggering of corresponding N trigger signals to generate corresponding N PWM signals, thereby reducing a frequency of at least one clock signal in the PWM control circuit. The loop control circuit includes N current sensing circuits and a digital trigger circuit, wherein the N current sensing circuits are configured to sense N phase currents of the corresponding N power stage circuits to generate the corresponding N current sensing signals. The loop control circuit generates the corresponding N PWM signals based on the corresponding N current sensing signals to control duty ratios of the N power stage circuits. The digital trigger circuit generates the N trigger signals in digital domain, based on a first clock signal, according to the digital output voltage-related signal and the digital summed current-related signal. The at least one clock signal includes the first clock signal.

In one preferred embodiment, the end times of the PWM signals are not synchronized with the first clock signal.

In one preferred embodiment, the N current sensing circuits are configured to sense the corresponding N phase currents in analog domain to generate the corresponding N current sensing signals, thereby reducing the frequency of the at least one clock signal.

In one preferred embodiment, when N is an integer greater than or equal to 2, the loop control circuit further includes a current balancing circuit operating in analog domain. The current balancing circuit generates corresponding N current balancing signals based on differences between an average value of the summed current-related signal and the N current sensing signals. The N current balancing signals are configured to adjust the corresponding N constant on-times to achieve current balancing among the corresponding N phase currents, thereby reducing the frequency of the at least one clock signal.

The advantages of the present invention are that the present invention proposes a dual-loop hybrid PWM control circuit that combines the advantages of the digital domain and the analog domain, reducing clock frequency and utilizing synthesized current to achieve low power consumption.

This document has detailed the present invention through specific embodiments. However, these descriptions are intended to facilitate understanding of the present invention's objectives, technical contents, features, and achieved effects, rather than to limit the scope of the present invention. Various combinations and equivalent variations, under the spirit of the present invention, can be conceived by those skilled in the art without departing from the scope and spirit of the present invention.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
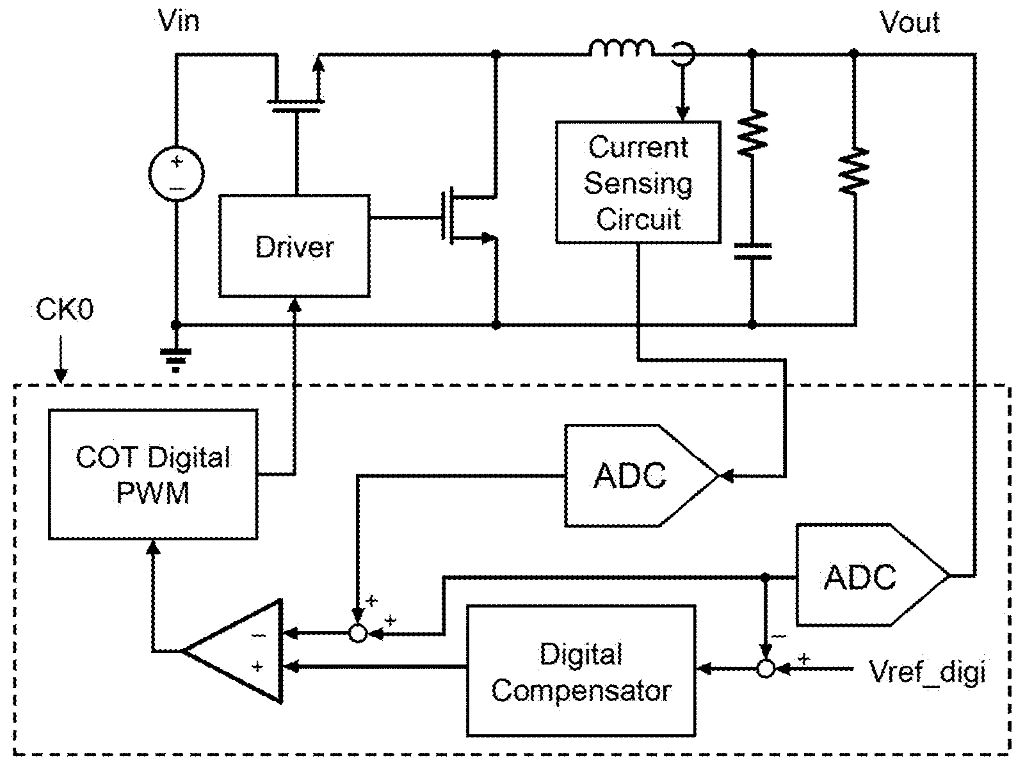
FIG. 1 shows a circuit schematic diagram of a prior art PWM control circuit.
Figure 2:
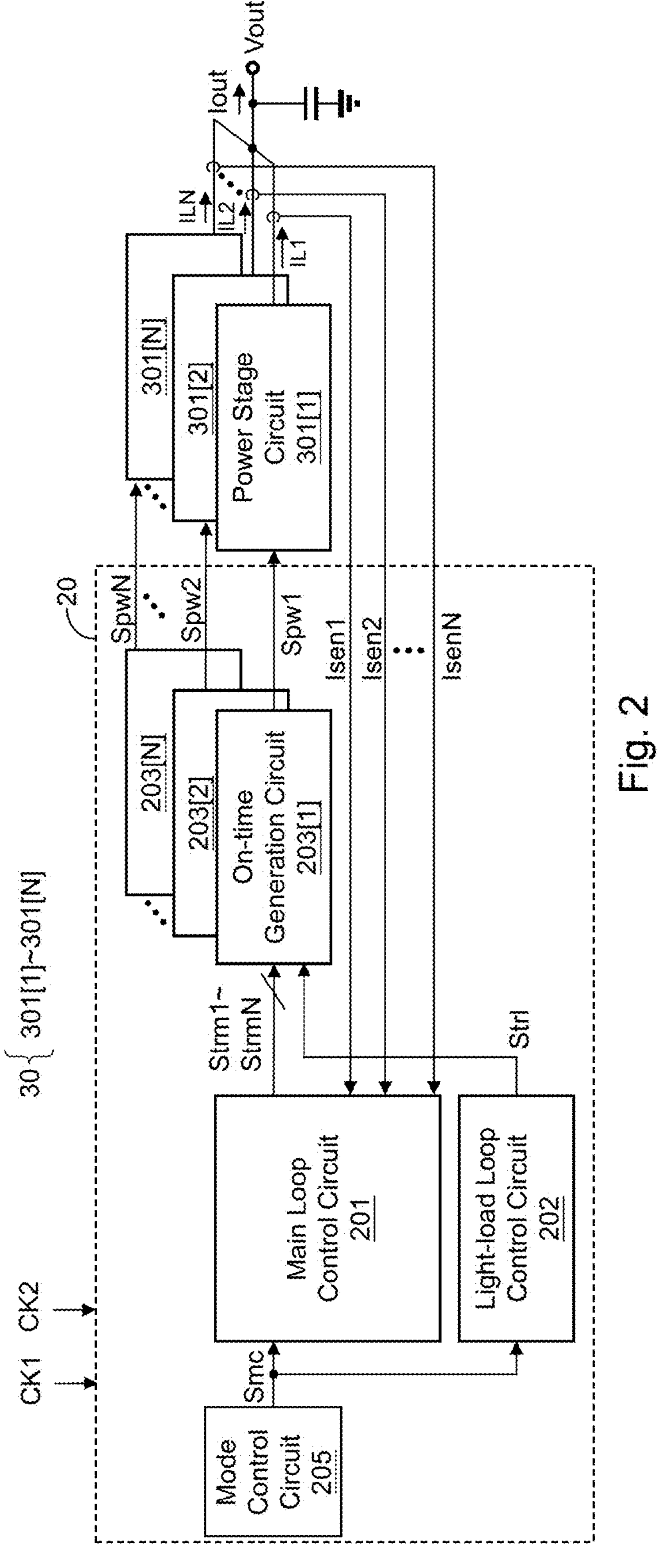
FIG. 2 shows a circuit block diagram of a PWM control circuit according to one embodiment of the present invention.

FIG. 2 shows a circuit block diagram of a PWM control circuit according to one embodiment of the present invention. As shown in FIG. 2, the PWM control circuit 20 of the present invention is configured to control a power conversion circuit 30. The PWM control circuit 20 includes a main loop control circuit 201, a light-load loop control circuit 202, N on-time generation circuits 203[1]-203[N] corresponding to N phases, and a mode control circuit 205. The power conversion circuit 30 includes N power stage circuits 301[1]-301[N], where N is an integer greater than or equal to 1. In a preferred embodiment, N is an integer greater than or equal to 2, meaning plural phases. In one embodiment, the on-time generation circuits 203[1]-203[N] are for use in controlling the power stage circuits 301[1]-301[N] respectively. The mode control circuit 205 is configured to generate a mode control signal Smc to indicate entry into either the main loop mode or the light-load mode. The main loop control circuit 201 and the light-load loop control circuit 202 are respectively configured to generate trigger signals Strm1~StrmN and trigger signals Str1 according to the mode control signal Smc.

In one embodiment, the PWM control circuit 20 controls the power conversion circuit 30 in a constant on-time (COT) control manner. The on-time generation circuits 203[1]-203[N] operate in the analog domain. More specifically, the on-time generation circuits 203[1]-203[N] are respectively configured to generate corresponding PWM signals Spw1~SpwN to control the duty cycle of the power stage circuits 301[1]-301[N] by timing corresponding N constant on-times in the analog domain according to the triggering of corresponding trigger signals Strm1~StrmN or Str1.

It is worth noting that, since the on-time generation circuits 203[1]-203[N] operate in the analog domain, the frequency of the clock signal in the PWM control circuit 20 of the present invention can be significantly reduced compared to the digital time generation circuits implemented in the digital domain in prior art, thereby reducing power consumption and improving conversion efficiency.

In one embodiment, the mode control circuit 205 is configured to determine whether the PWM control circuit 20 controls the power conversion circuit 30 to operate in the main loop mode or the light-load mode based on, for example, the load current Iout. When the load current Iout is in a medium or heavy load condition, the PWM control circuit 20 operates in the main loop mode. When the load current Iout is in a light load condition, the PWM control circuit 20 operates in the light-load mode. The main loop control circuit 201 is configured to generate corresponding PWM signals Spw1~SpwN in the main loop mode based on the phase currents IL1~ILN. In the light-load mode, the main loop control circuit 201 enters a power-saving state to reduce the power consumption of the PWM control circuit 20.

Simultaneously, the light-load loop control circuit 202 generates PWM signals Spw1~SpwN in light-load mode in a more power-efficient manner compared to the main loop control circuit 201, so as to perform loop control. The details of the power-saving state and the configuration and operation of the loop control circuits will be described later. In one embodiment, in the light-load mode, the power conversion circuit can operate in only a single phase when the load is sufficiently low, where the light-load loop control circuit 202 may generate, for example, only the PWM signal Spw1 to control the power stage circuit 301[1].

Figure 3:
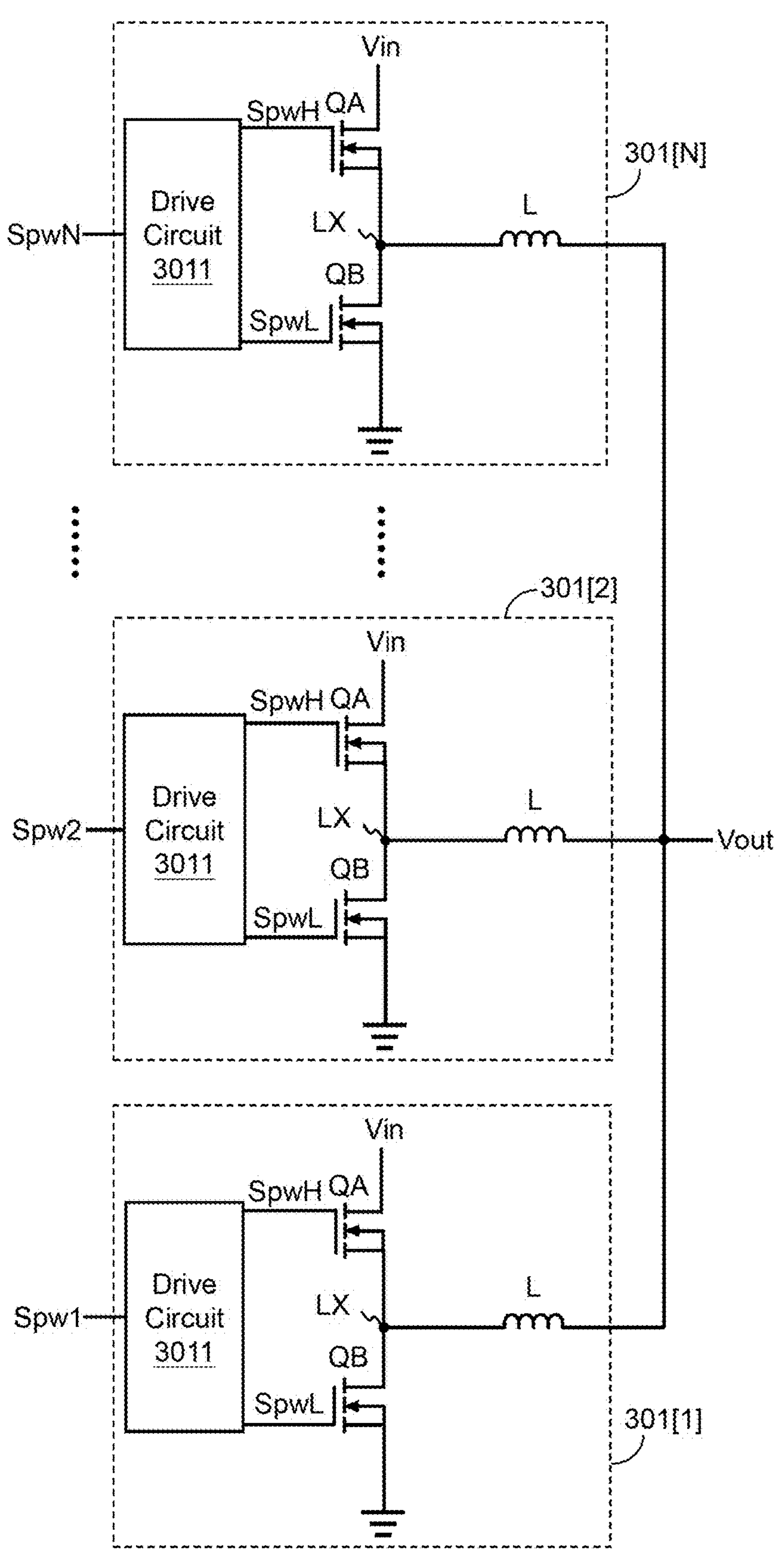
FIG. 3 shows a circuit schematic diagram of a power stage circuit of a power conversion circuit applying the PWM control circuit according to one embodiment of the present invention.

FIG. 3 shows a circuit schematic diagram of the power stage circuit of the power conversion circuit applying the PWM control circuit according to one embodiment of the present invention. This embodiment shows an exemplary embodiment of the power stage circuits 301[1]-301[N] in FIG. 2. As shown in FIG. 3, each of the power stage circuits 301[1]-301[N] includes a drive circuit 3011, a high side switch QA, a low side switch QB, and an inductor L. The high side switch QA is coupled between an input voltage Vin and a switching node LX, and the low side switch QB is coupled between the switching node LX and a ground level. The inductor L is coupled between the switching node LX and an output voltage Vout. The drive circuit 3011 is configured to generate corresponding high side control signals SpwH and low side control signals SpwL according to the corresponding PWM signals Spw1~SpwN to control the high side switch QA and the low side switch QB, respectively.

Figure 4:
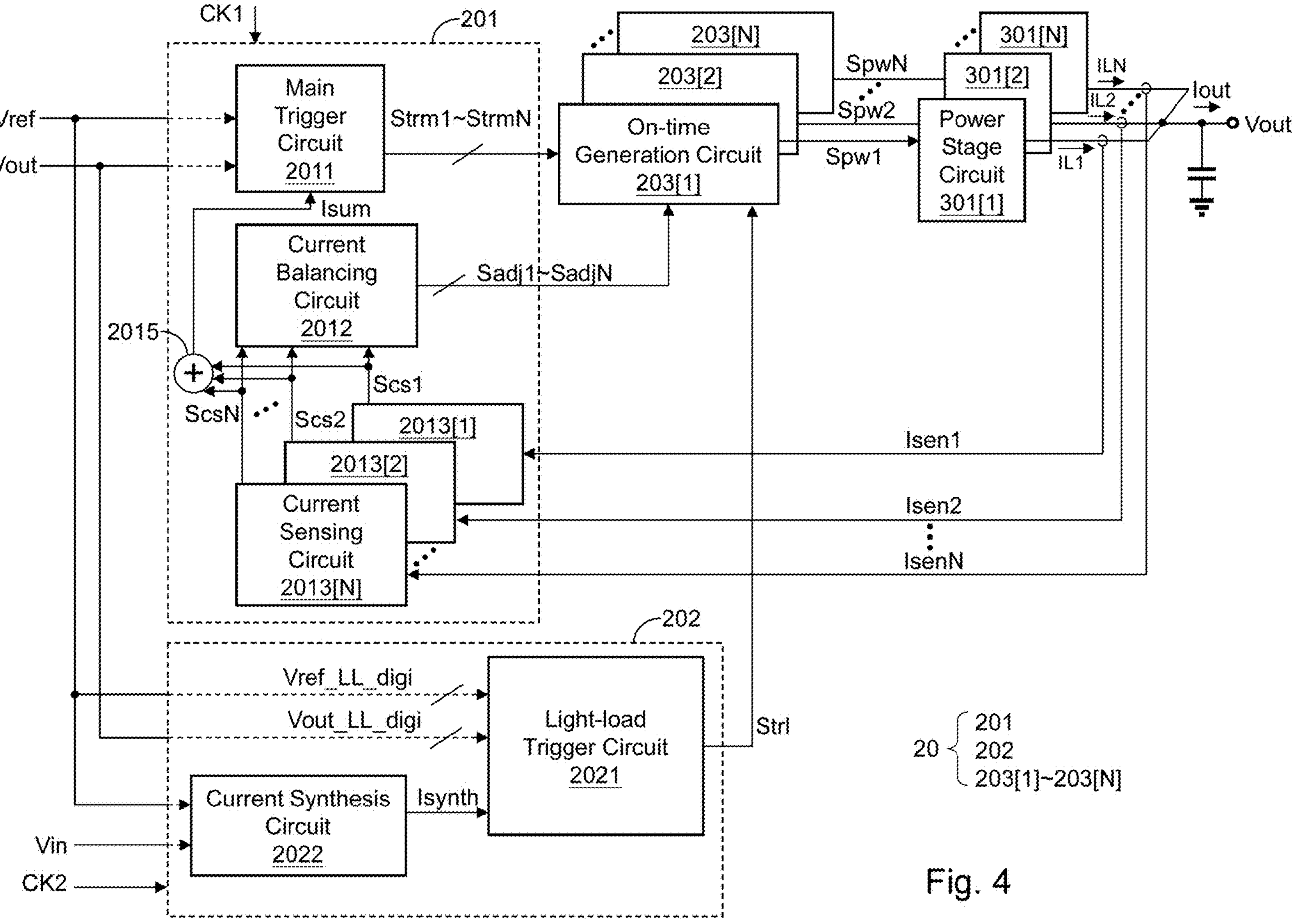
FIG. 4 shows a circuit block diagram of a PWM control circuit according to one embodiment of the present invention.

FIG. 4 shows a circuit block diagram of the PWM control circuit according to one embodiment of the present invention. FIG. 4 is a specific embodiment corresponding to that shown in FIG. 2. As shown in FIG. 4, the main loop control circuit 201 includes a main trigger circuit 2011, a current balancing circuit 2012, current sensing circuits 2013[1]~2013[N], and an adder circuit 2015. It should be noted that in this embodiment, N is plural, thus requiring the following current balancing operations. The current sensing circuits 2013[1]~2013[N] operate in the analog domain and are respectively configured to sense the phase currents IL1~ILN (i.e., the inductor currents of each phase) of the corresponding power stage circuits 301[1]~301[N] in the analog domain to generate corresponding current sensing signals Scs1~ScsN. The adder circuit 2015 is configured to sum the current sensing signals Scs1~ScsN to generate a summed current-related signal Isum. The current balancing circuit 2012 operates in the analog domain and is configured to respectively generate corresponding plural current balancing signals Sadj1~SadjN based on the difference between an average value of the summed current-related signal Isum and the corresponding current sensing signals Scs1~ScsN. The plural current balancing signals Sadj1~SadjN are respectively configured to adjust the constant t on-times generated by the corresponding on-time generation circuits 203[1]-203[N] to achieve current balancing among the phase currents IL1~ILN.

The main loop control circuit 201 generates corresponding PWM signals Spw1~SpwN in the main loop mode based on the current sensing signals Scs1~ScsN. Specifically, the main trigger circuit 2011 generates corresponding trigger signals Strm1~StrmN in the main loop mode based on the summed current-related signal Isum, the target value Vref of the output voltage, and the output voltage Vout, and further generates corresponding PWM signals Spw1~SpwN through the on-time generation circuits 203[1]-203[N] to respectively control the duty cycles of the power stage circuits 301[1]-301[N]. As mentioned earlier, in the main loop mode, the present invention performs current sensing and current balancing in the analog domain through analog current sensing circuits, adder circuits, current balancing circuits, and on-time generation circuits, thereby reducing the frequency of at least one clock signal mentioned above and consequently reducing power consumption.

Still referring to FIG. 4, the light-load loop control circuit 202 includes a current synthesis circuit 2022 and a light-load trigger circuit 2021. The current synthesis circuit 2022 is configured to generate a synthesized current signal Isynth based on the input voltage Vin, the target value Vref of the output voltage, and the inductance value of the inductors of the power stage circuits 301[1]-301[N]. The light-load loop control circuit 202 generates PWM signals Spw1~SpwN in the light-load mode based on the synthesized current signal Isynth.

It should be noted that in the present invention, the synthesized current Isynth includes a first synthesized current signal Isynth1_digi for emulating the average current and a second synthesized current signal Isynth2_digi for emulating the real-time current. The specific generation, function, and operation of these synthesized currents will be detailed in the following paragraphs.

Specifically, in one embodiment, in the light-load mode, the light-load trigger circuit 2021 generates the trigger signal Str1 based on the synthesized current signal Isynth, the digital light-load reference-related signal Vref_LL_digi, and the digital light-load output-related signal Vout_LL_digi, and further generates the PWM signal Spw1 through the on-time generation circuit 203[1] to determine the on-time, thereby controlling the duty ratio of the power stage circuit 301[1]. The aforementioned digital light-load reference-related signal Vref_LL_digi is correlated with the target value Vref of the output voltage, and the digital light-load output-related signal Vout_LL_digi is correlated with the output voltage Vout.

In one embodiment, in the light-load mode, the aforementioned power-saving state can include at least one of the following: reducing the power consumption of the current sensing circuits 2013[1]~2013[N], reducing the power consumption of the current balancing circuit 2012, or reducing the power consumption of the main trigger circuit 2011. Specifically, the aforementioned methods for reducing power consumption can include, for example but are not limited to, stopping the operation of the current sensing circuits 2013[1]~2013[N], stopping the operation of the current balancing circuit 2012, or stopping the operation of the main trigger circuit 2011. In one embodiment, the power consumption of the operation of the current synthesis circuit 2022 is lower than the power consumption of the operation of the current sensing circuits 2013[1]~2013[N]. Therefore, in the light-load mode, the present invention can achieve power-saving effects by replacing some of the circuits in the main loop with the current synthesis circuit 2022. It is also worth noting that the aforementioned stopping operation can further include stopping the supply of bias currents to these circuits to further save power. The bias currents can be re-supplied to these circuits to restart them to a ready state before switching back to the main loop mode.

It is worth noting that at least a portion of the main loop control circuit 201 operates in the digital domain based on the first clock signal CK1 in the main loop mode, and at least a portion of the light-load loop control circuit 202 operates in the digital domain based on the second clock signal CK2 in the light-load mode. In one embodiment, the frequency of the second clock signal CK2 is lower than that of the first clock signal CK1, such that the light-load loop control circuit 202 operating in the light-load mode can further save power. On the other hand, since the present invention adopts an analog-digital hybrid architecture, especially utilizing the on-time generation circuit operating in the analog domain, the frequencies of the first clock signal CK1 and the second clock signal CK2 in the PWM control circuit of the present invention are both much lower (e.g., 1/20) than the frequency of the clock signal CK0 required in prior art, thereby having the advantage of saving power compared to the prior art.

Figure 5:
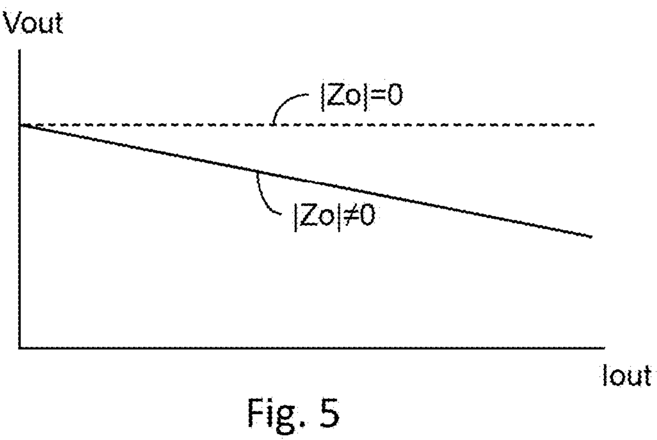
FIG. 5 shows a characteristic chart of the output voltage versus the load current of the PWM control circuit according to one embodiment of the present invention.

FIG. 5 shows a characteristic chart of the output voltage versus the load current of the PWM control circuit according to one embodiment of the present invention. Please refer to both FIG. 5 and FIG. 4. In one embodiment, in the light-load mode, the synthesized current signal Isynth is configured to control the output voltage Vout of the power conversion circuit 30, such that the output voltage Vout varies with the load current Iout according to a predetermined load line Zo. In other words, the characteristic curve of the output voltage Vout versus the load current Iout corresponds to a predetermined load line Zo that is not equal to 0. Please refer to both FIG. 5 and FIG. 4. In another embodiment, in the main loop mode, the current sensing signals Scs1~ScsN are configured to control the output voltage Vout of the power conversion circuit 30, such that the output voltage Vout varies with the load current Iout according to the predetermined load line Zo.

Figure 6:
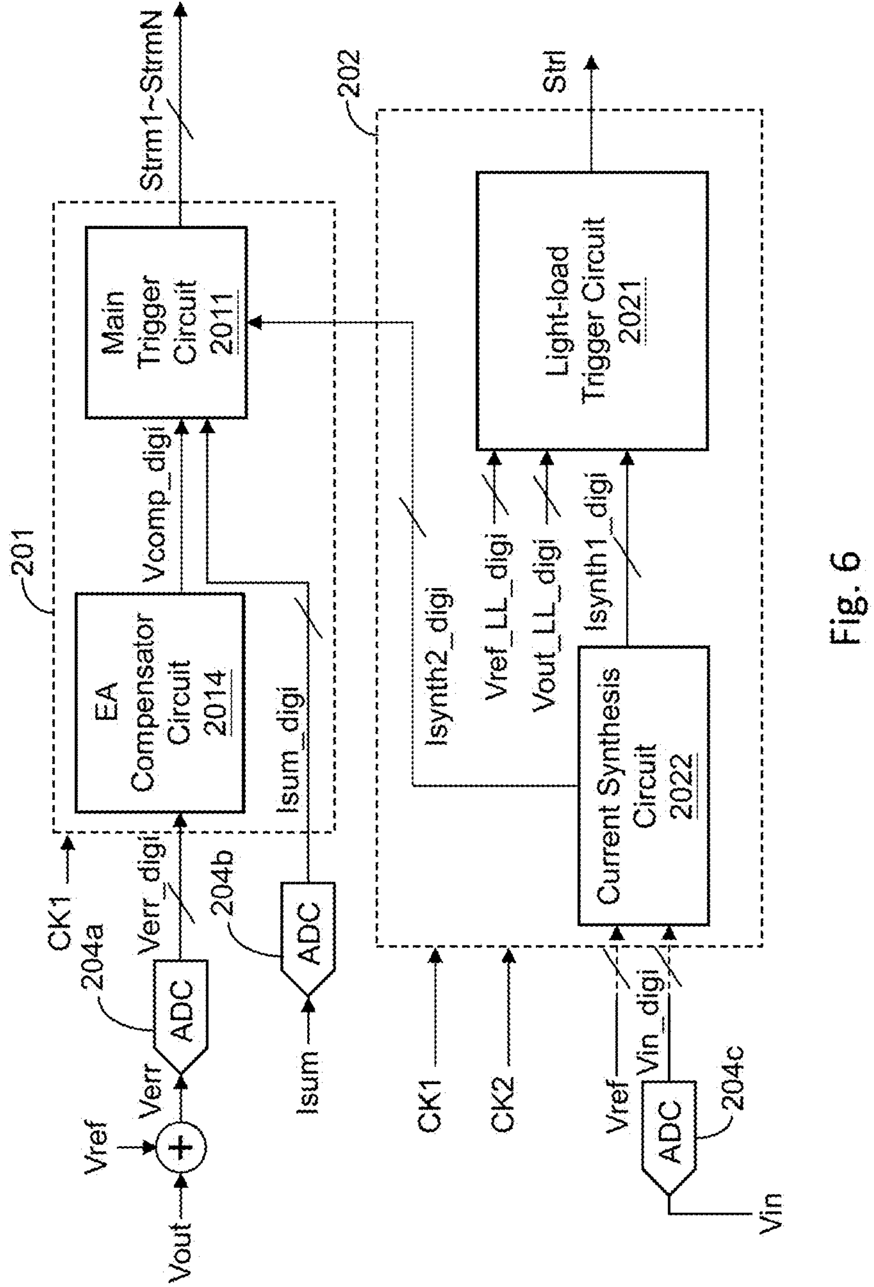
FIG. 6 shows a circuit block diagram of a main loop control circuit and a light-load loop control circuit of the PWM control circuit according to another embodiment of the present invention.

FIG. 6 shows a circuit block diagram of the main loop control circuit and the light-load loop control circuit of the PWM control circuit according to another embodiment of the present invention. This embodiment partially implements the main loop control circuit 201 and the light-load loop control circuit 202 in a digital manner. As shown in FIG. 6, the first analog-to-digital converter 204*a* is configured to convert the output voltage-related signal Verr correlated with the output voltage Vout into a digital output voltage-related signal Verr_digi in the digital domain. The output voltage-related signal Verr is the difference between the output voltage Vout and the target value Vref of the output voltage. The second analog-to-digital converter 204*b* is configured to convert the summed current-related signal Isum into a digital summed current-related signal Isum_digi in the digital domain. The third analog-to-digital converter 204*c* is configured to convert the input voltage Vin into an input voltage Vin_digi in the digital domain. The summed current-related signal Isum is the sum of the current sensing signals Scs1~ScsN.

In one embodiment, the PWM control circuit 20 of the present invention further includes a transition mode, which is configured to enable seamless switching from the light-load mode to the main loop mode. Specifically, in the light-load mode, when, for example, the load changes to a heavy load or the target output voltage changes, the PWM control circuit 20 needs to switch to the main loop mode. At this time, since the analog circuits in the main loop control circuit 201 that were stopped in the light-load mode need time to restart, a period of time long enough to restart the main loop control circuit 201 to the ready state is required before starting operating in the main loop mode. In view of this, in one embodiment of the present invention, a transition mode is entered before switching to the main loop mode. In the transition mode, the main loop control circuit 201 exits the power-saving state to restart the stopped analog circuits and replaces the digital summed current-related signal Isum_digi with the second synthesized current signal Isynth2_digi for loop control in the transition mode, so as to generate trigger signals Strm1~StrmN and subsequently generate PWM signals Spw1~SpwN through the on-time generation circuits 203[1]-203[N]. This allows for early activation of the multi-phase control loop and performs for example loop control in current mode or adjusts the output voltage to meet the predetermined load line requirement mentioned above through the synthesized current information.

Specifically, in the transition mode, the current synthesis circuit 2022 generates the second synthesized current signal Isynth2_digi in the digital domain based on the first clock signal CK1, and the error amplification compensation circuit 2014 of the main loop control circuit 201 generates the digital comparison result Vcomp_digi according to the digital output voltage-related signal Verr_digi based on the first clock signal CK1. The main trigger circuit 2011 generates trigger signals Strm1~StrmN based on the digital comparison result Vcomp_digi and the second synthesized current signal Isynth2_digi which replaces the digital summed current-related signal Isum_digi. The trigger signals Strm1~StrmN are configured to respectively trigger the on-time generation circuits 203[1]-203[N] to generate PWM signals Spw1~SpwN.

Figure 7:
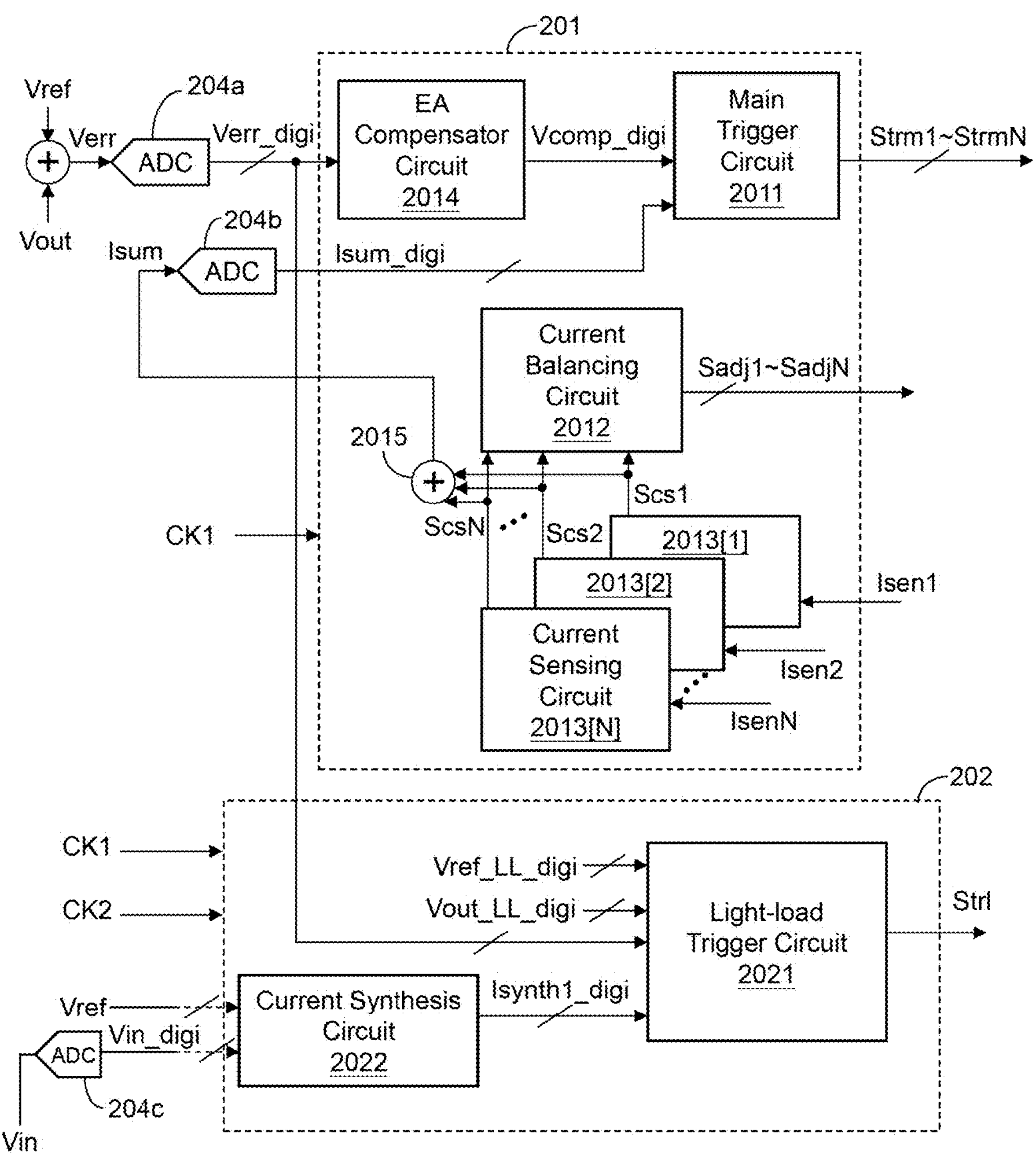
FIG. 7 shows a circuit block diagram of the main loop control circuit and the light-load loop control circuit of the PWM control circuit according to yet another embodiment of the present invention.

FIG. 7 shows a circuit block diagram of the main loop control circuit and the light-load loop control circuit of the PWM control circuit according to yet another embodiment of the present invention. The current sensing circuits 2013[1]~2013[N], the current balancing circuit 2012, the adder circuit 2015, the error amplification compensation circuit 2014, the main trigger circuit 2011, the first analog-to-digital converter 204*a*, and the second analog-to-digital converter 204*b* in this embodiment are respectively similar to the current sensing circuits 2013[1]~2013[N], the current balancing circuit 2012, the adder circuit 2015 in FIG. 4, and the error amplification compensation circuit 2014, the main trigger circuit 2011, the first analog-to-digital converter 204*a*, and the second analog-to-digital converter 204*b* in FIG. 6, and thus their descriptions are omitted herein. This embodiment shows a more complete embodiment based on the embodiments of FIG. 4 and FIG. 6. In this embodiment, the summed current-related signal Isum generated by the adder circuit 2015 is converted into the digital summed current-related signal Isum_digi through the second analog-to-digital converter 204*b*, which is subsequently provided to the main trigger circuit 2011 for PWM operation in the digital domain.

This embodiment partially implements the main loop control circuit 201 and the light-load loop control circuit 202 in a digital manner. The main loop control circuit 201 operates in the digital domain based on the first clock signal CK1 in the main loop mode. The main loop control circuit 201 generates trigger signals Strm1~StrmN based on the digital output voltage-related signal Verr_digi and the digital summed current-related signal Isum_digi.

In the light-load mode, the current synthesis circuit 2022 further generates the first synthesized current signal Isynth1_digi according to the constant on-time, the input voltage Vin, the target value Vref of the output voltage, the inductance value of the inductors, and the switching period information in the digital domain based on the second clock signal CK2. The light-load trigger circuit 2021 generates the trigger signal Str1 in the digital domain, based on the second clock signal CK2, according to the digital output voltage-related signal Verr_digi and the first synthesized current signal Isynth1_digi. In one embodiment, the frequency of the second clock signal CK2 is lower than that of the first clock signal CK1, thereby reducing the power consumption of the PWM control circuit 20 in the power-saving state. In one embodiment, since the pulse width of the PWM signals Spw1~SpwN is determined by the on-time generation circuits in the analog domain, the end time of the PWM signals Spw1~SpwN is not synchronized with the first clock signal CK1.

It should be noted that the current synthesis circuit 2022 generates the second synthesized current signal Isynth2_digi in the digital domain to emulate the real-time summed current-related signal Isum and generates the first synthesized current signal Isynth1_digi in the digital domain to emulate the average value of the summed current-related signal Isum based on the aforementioned parameters through digital estimation.

Figure 8:
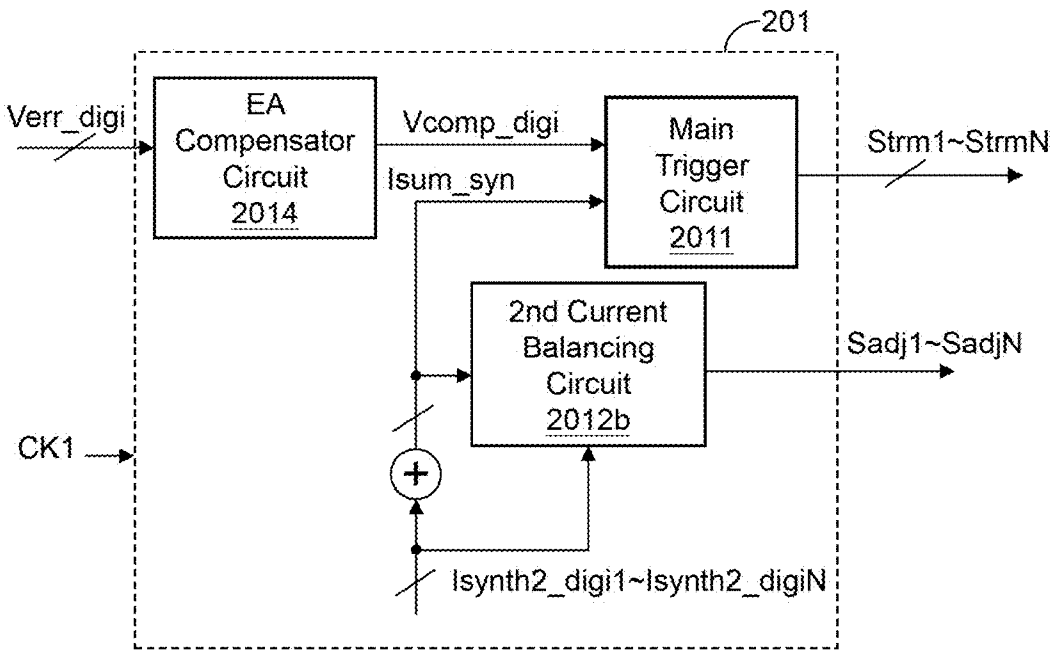
FIG. 8 shows a circuit block diagram of the main loop control circuit of the PWM control circuit according to still another embodiment of the present invention.

FIG. 8 shows a circuit block diagram of the main loop control circuit of the PWM control circuit according to another embodiment of the present invention. The error amplification compensation circuit 2014 and the main trigger circuit 2011 of this embodiment are similar to the error amplification compensation circuit 2014 and the main trigger circuit 2011 in FIG. 7, and thus their descriptions are omitted. The difference between this embodiment and the embodiment of FIG. 7 is that in the transition mode, the current balancing circuit is implemented in a digital manner, allowing the main loop control circuit 201 to perform trigger control for loop switching fully digitally. As shown in FIG. 8, the main loop control circuit 201 includes a second current balancing circuit 2012*b*. The second current balancing circuit 2012*b* operates in the digital domain and is configured to generate corresponding current balancing signals Sadj1 to SadjN in transition mode, based on the differences between the average of the sum of all second synthesized current signals (i.e., the summed synthesized current signal Isum_syn) and each of the second synthesized current signals Isynth2_digi1 to Isynth2_digiN, respectively.

Figure 9:
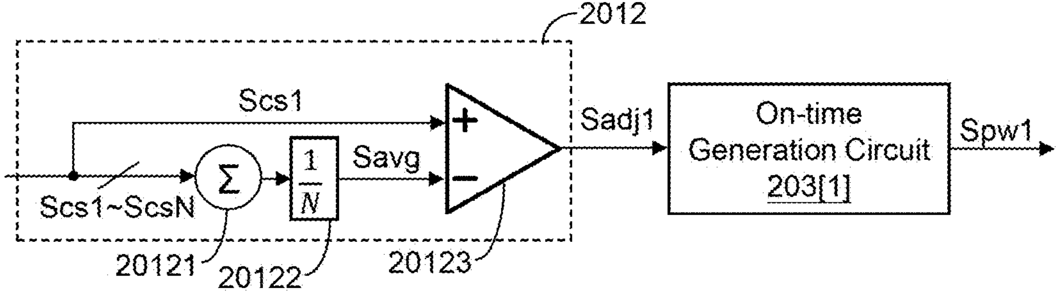
FIG. 9 shows a circuit schematic diagram of a current balancing circuit of the main loop control circuit of the PWM control circuit according to one embodiment of the present invention.

FIG. 9 shows a circuit schematic diagram of a current balancing circuit of the main loop control circuit of the PWM control circuit according to one embodiment of the present invention. This embodiment is for example an exemplary embodiment of the aforementioned current balancing circuit 2012. This embodiment only shows the current balancing circuit 2012 of one phase, and the other phases are identical. As shown in FIG. 9, the current balancing circuit 2012 includes an adder circuit 20121, a division circuit 20122, and an error circuit 20123, all operating in the analog domain. The analog current sensing signals Scs1~ScsN are summed by the adder circuit 20121 and subsequently averaged by the division circuit 20122 to generate the average value Savg of the summed current-related signal. The error circuit 20123 is configured to generate the current balancing signal Sadj1 based on the difference between the average value Savg of the summed current-related signal and the current sensing signal Scs1, so as to adjust the pulse width of the PWM signal Spw1 generated by the on-time generation circuit 203[1].

Figure 10:
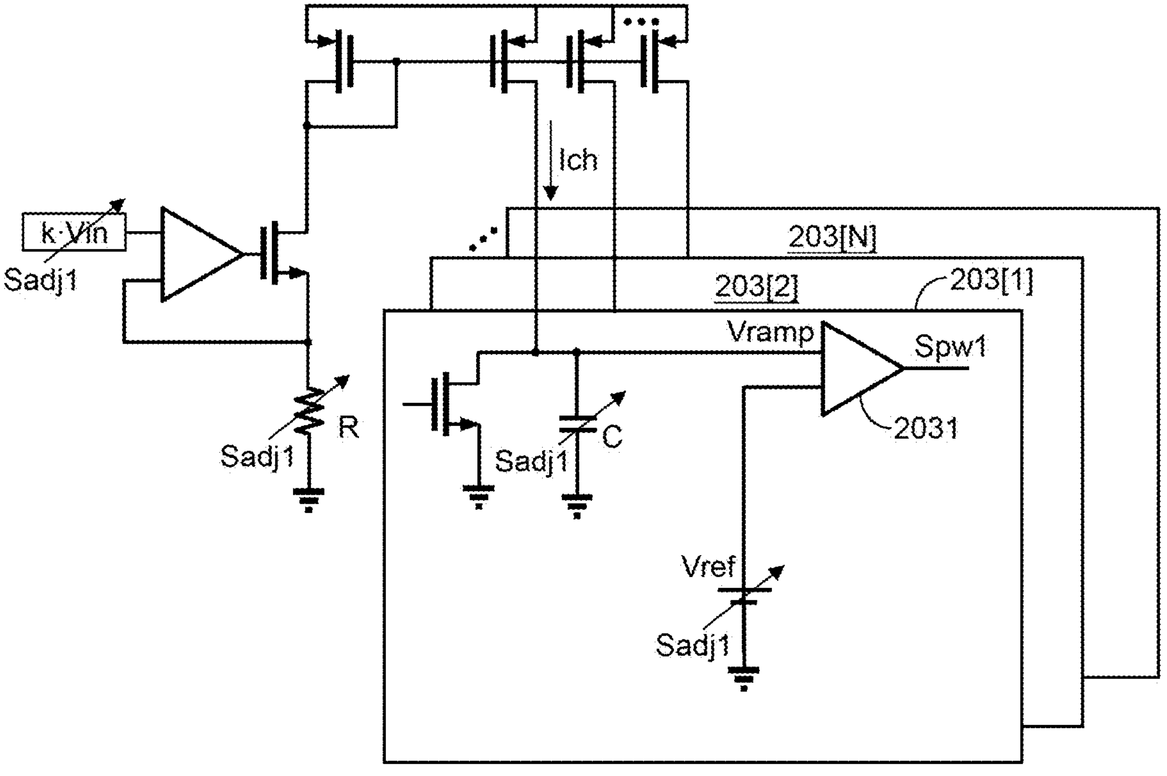
FIG. 10 shows a circuit schematic diagram of an on-time generation circuit of the PWM control circuit according to one embodiment of the present invention.

FIG. 10 shows a circuit schematic of an on-time generation circuit of the PWM control circuit according to one embodiment of the present invention. This embodiment shows an exemplary embodiment of the on-time generation circuits 203[1]~203[N]. This embodiment only shows the on-time generation circuit 203[1] of one phase, and the other phases are identical. As shown in FIG. 10, the on-time generation circuit 203[1] includes a comparison circuit 2031. The charging current Ich charges the capacitor C to generate a ramp signal Vramp. The comparison circuit 2031 is configured to compare the target value Vref of the output voltage with the ramp signal Vramp having a fixed period to determine the pulse width of the PWM signal Spw1. In one embodiment, the charging current Ich is correlated with the resistance R and/or the input voltage Vin. In one embodiment, at least one of the resistance value of the resistor R, the capacitance value of the capacitor C, the target value Vref of the output voltage, or the sensed signal of the input voltage Vin (k*Vin) can be adjusted according to the aforementioned current balancing signal Sadj1 to adjust the pulse width of the PWM signal Spw1.

Figure 11:
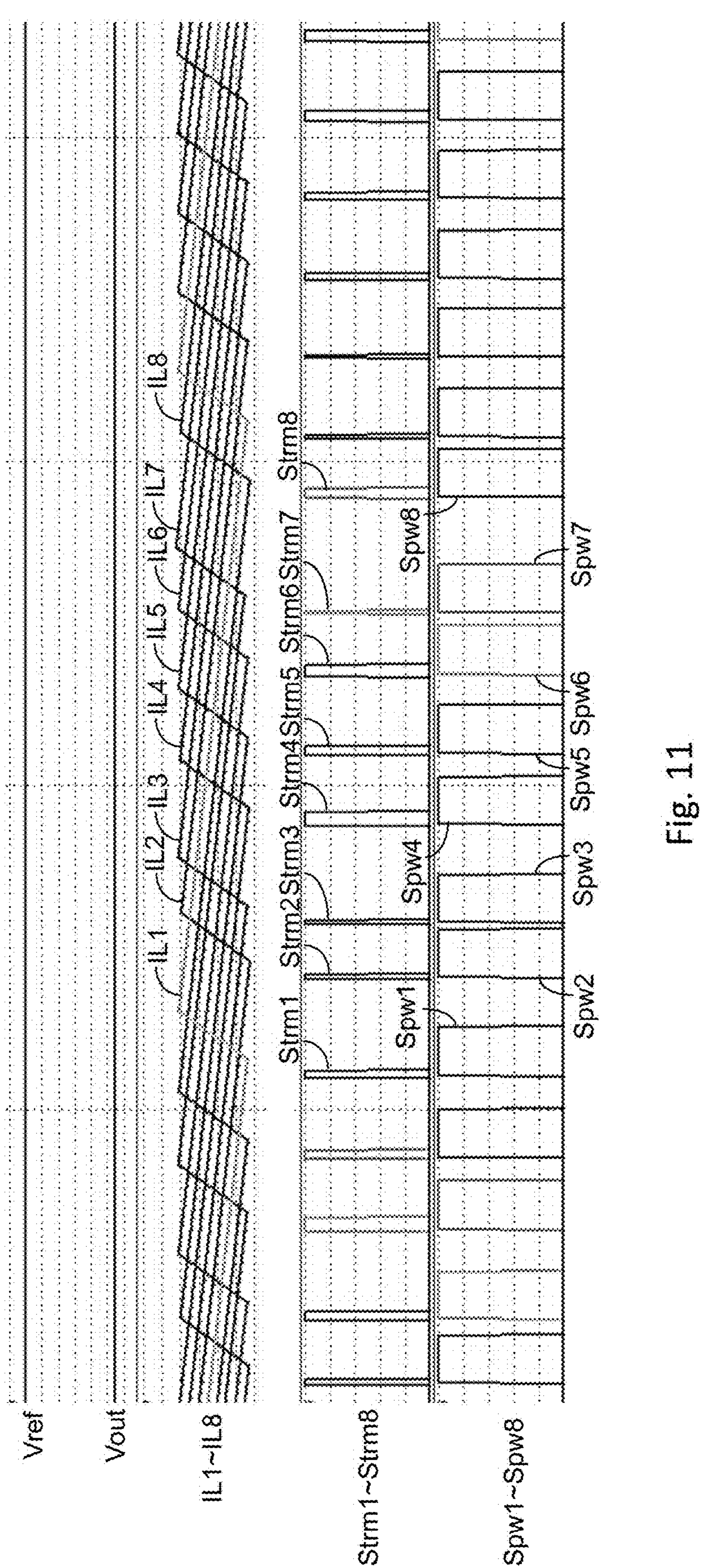
FIGS. 11 to 13 show signal waveform diagrams of related signals of the PWM control circuit and the power conversion circuit according to the embodiments of the present invention.

FIG. 11 shows a signal waveform diagram of related signals of the PWM control circuit and the power conversion circuit in steady-state operation according to one embodiment of the present invention. In this embodiment, the number of phases N of the power conversion circuit is 8. FIG. 11 shows the target value Vref of the output voltage, the output voltage Vout, the phase currents IL1~IL8, the trigger signals Strm1~Strm8, and the PWM signals Spw1~Spw8. As shown in FIG. 11, the pulses of the trigger signals Strm1~Strm8 are configured to respectively trigger the PWM signals Spw1~Spw8 to switch to the enable level, and the high side switches of the corresponding phases are conducted sequentially in an interleaved manner. The corresponding on-times are determined by the on-time generation circuits of the corresponding phases respectively.

Figure 12:
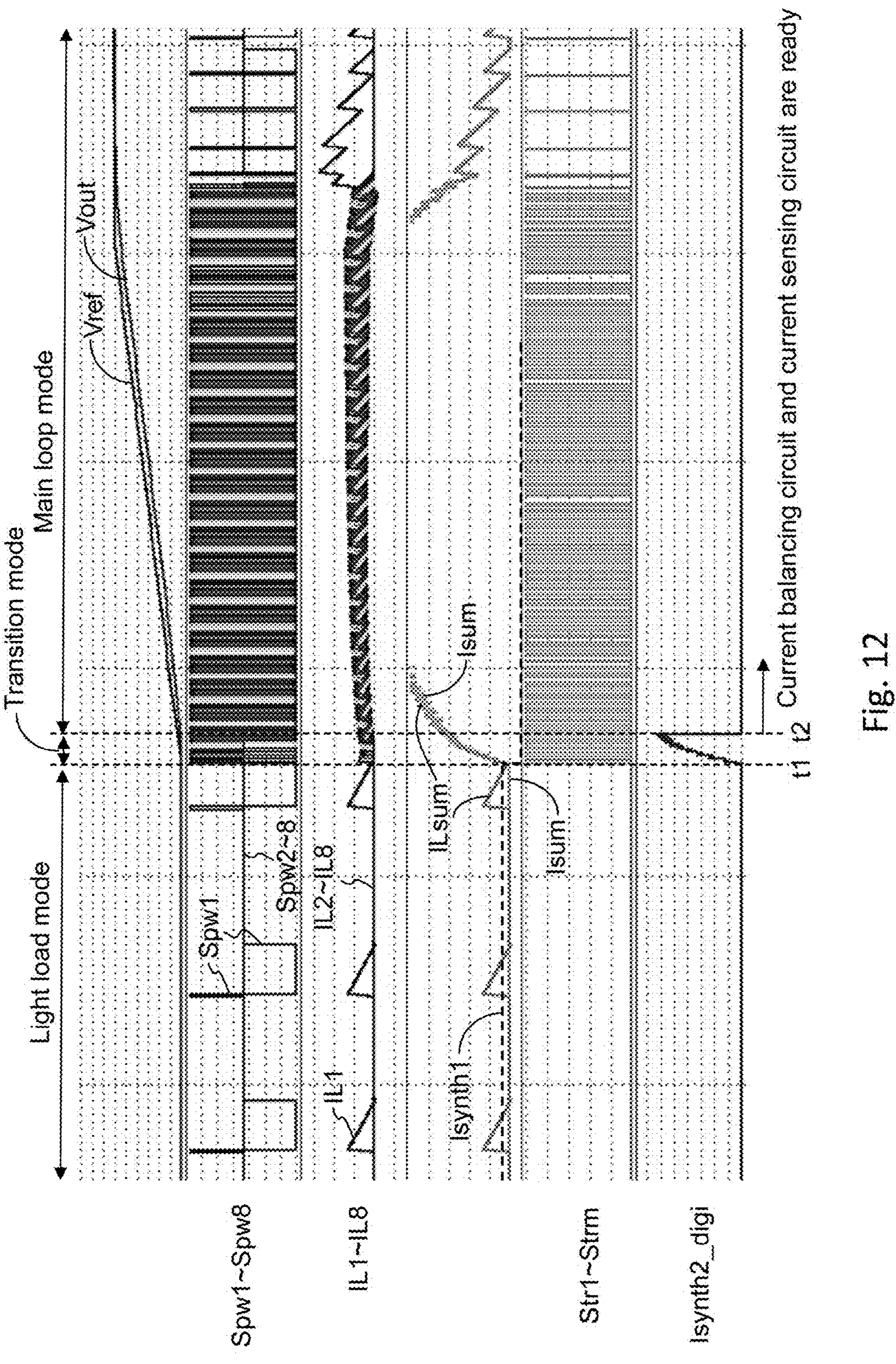

FIG. 12 shows a signal waveform diagram of related signals of the PWM control circuit and the power conversion circuit according to one embodiment of the present invention. The target value Vref of the output voltage, the output voltage Vout, the PWM signals Spw1~Spw8, the phase currents IL1~IL8, the first synthesized current signal Isynth1_digi, the summed current-related signal Isum, the summed phase current ILsum, the trigger signals Strm1~Strm8, and the second synthesized current signal Isynth2_digi are shown in FIG. 12, where the summed phase current ILsum is equal to the sum of the phase currents IL1~ILN.

As shown in FIG. 12, before time t1, the power conversion circuit of this embodiment operates in the light-load mode, where the first synthesized current signal Isynth1_digi is updated based on the period of the second clock signal CK2 to emulate the average value of the corresponding phase current IL1 for the aforementioned light-load mode power conversion. Furthermore, in this embodiment, in the light-load mode, only the first phase PWM signal Spw1 is triggered by the trigger signal Str1 generated by the light-load loop control circuit 202 according to the first synthesized current signal Isynth1_digi, and operates in discontinuous conduction mode. On the other hand, in this embodiment, in the light-load mode, the main loop control circuit is in the power-saving state, and thus the summed current-related signal Isum and the trigger signals Strm1~Strm8 are not generated, and the PWM signals Spw2~Spw8 are all in the disable level, meaning, for example, high-impedance state or intermediate level, so as to control the high and low side switches of the corresponding phases to be off, such that the phase currents IL2~IL8 are all 0. In other words, only the phase current IL1 supplies the load.

Subsequently, as shown in FIG. 12, at time t1, the transition mode is entered. In the transition mode between time t1 and t2, the second synthesized current signal Isynth2_digi is configured to emulate the summed phase current ILsum in real time. Specifically, in the transition mode, the second synthesized current signal Isynth2_digi is updated based on the period of the first clock signal CK1 to emulate the summed phase current ILsum and/or the phase currents IL1~IL8 in real time. Thus, in the transition mode, the main loop control circuit generates the trigger signals Strm1~Strm8 and the PWM signals Spw1~Spw8 according to the second synthesized current signal Isynth2_digi for loop control and current balancing, so as to achieve power conversion.

Subsequently, at time t2, the main loop mode is entered. Since all circuits in the main loop have been restarted to the ready state before time t2, in the main loop mode after time t2, the summed current-related signal Isum can already reflect the summed phase current ILsum in real time, and the main loop control circuit 201 starts to generate the corresponding trigger signals Strm1~Strm8 and the PWM signals Spw1~Spw8 according to the aforementioned main loop to perform loop control, so as to achieve power conversion.

In one embodiment, in the transition mode, the generation of the first synthesized current signal Isynth1_digi can be stopped, while in the light-load mode and the main loop mode, the generation of the second synthesized current signal Isynth2_digi can be stopped, thereby further reducing power consumption.

Figure 13:
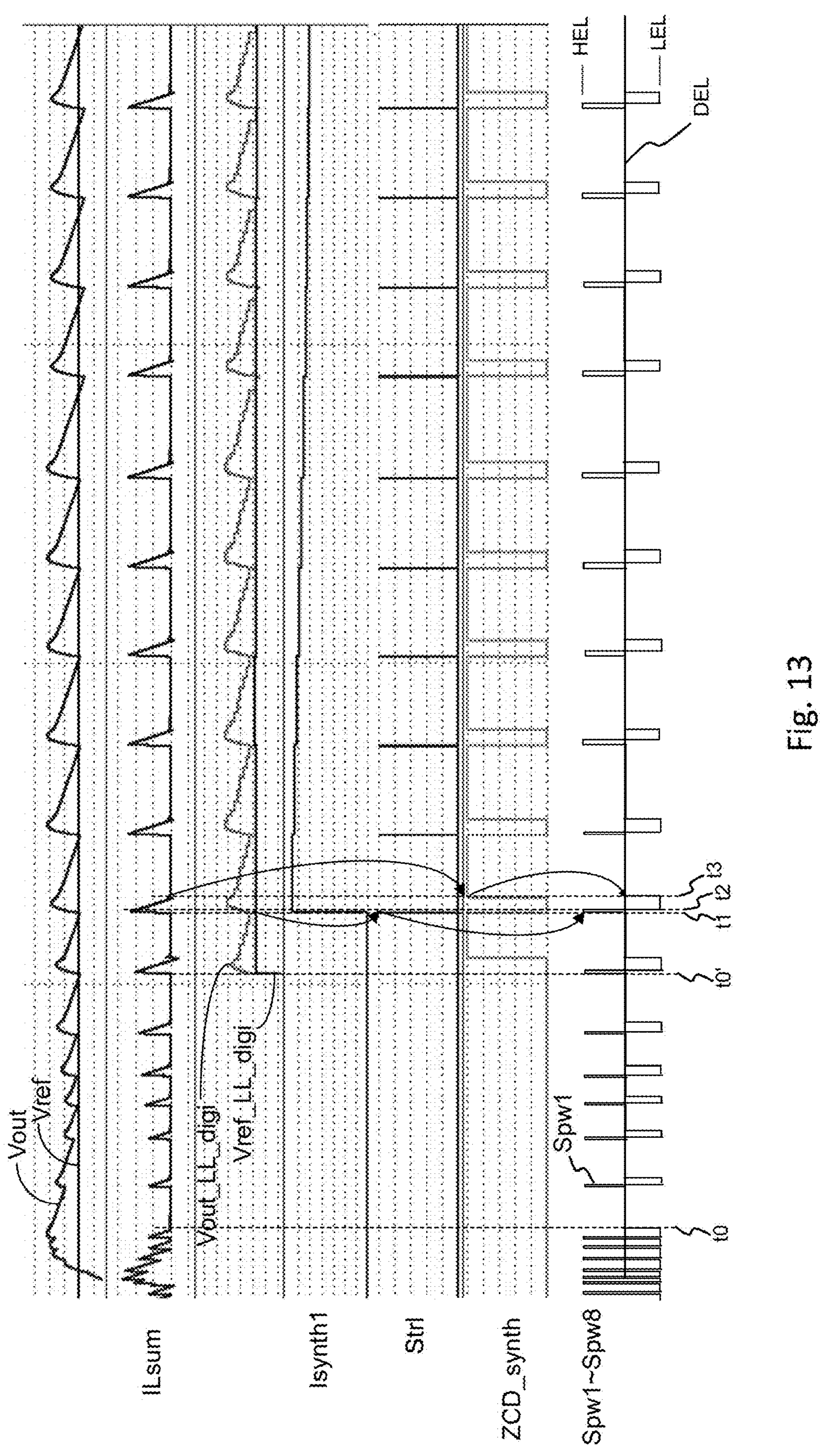

FIG. 13 shows a signal waveform diagram of related signals of the PWM control circuit and the power conversion circuit according to one embodiment of the present invention. The target value Vref of the output voltage, the output voltage Vout, the summed phase current ILsum, the digital light-load output-related signal Vout_LL_digi, the digital light-load reference-related signal Vref_LL_digi, the first synthesized current signal Isynth1_digi, the trigger signal Str1, the synthesized zero current signal ZCD_synth, and the PWM signals Spw1~Spw8 are shown in FIG. 13.

Specifically, FIG. 13 shows the operation waveforms of the related signals for switching from the main loop mode to the light-load mode. Please refer to both FIG. 13, FIG. 3, and FIG. 4. Before time t0', the power conversion circuit of this embodiment operates in the main loop mode, where, before time t0, multi-phase power conversion is performed by the main loop control circuit 201. Subsequently, starting at time to, due to the extremely light load, only one phase's power stage circuit performs switching conversion (corresponding to the PWM signal Spw1). Subsequently, between time t0 and time t0', it is determined whether the output current determined by summing all the corresponding current sensing signals Scs1~ScsN (i.e., the summed current-related signal Isum) has decreased to below a predetermined threshold, or whether the switching period time Tsw of the PWM signals Spw1~SpwN exceeds a predetermined time for over the predetermined number of times. That is, it is determined by the switching period whether the load has decreased to a corresponding threshold. At time t0' in this embodiment, it is determined that the current is below the predetermined threshold for over the predetermined number of times, thus the light-load mode is entered, and the light-load loop control circuit 202 takes over the loop control. The digital light-load output-related signal Vout_LL_digi, the digital light-load reference-related signal Vref_LL_digi, and the first synthesized current signal Isynth1_digi start to be generated.

For example, at time t1, when the digital light-load output-related signal Vout_LL_digi in the digital domain reaches the digital light-load reference-related signal Vref_LL_digi, the trigger signal Str1 sends a trigger pulse to switch the PWM signal Spw1 to the high side enable level HEL to turn on the high side switch QA of the power stage circuit 301[1]. The on-time is determined by for example the on-time generation circuit 203[1]. Please refer to both FIG. 3 and FIG. 13. At time t2, when the on-time ends, the PWM signal Spw1 switches to the low side enable level LEL to turn on the low side switch QB of the power stage circuit 301[1]. The phase current IL1 (which is the same as the summed phase current ILsum at this time) correspondingly turns from rising to falling. At time t3, the synthesized zero current signal ZCD_synth generated by the light-load loop control circuit 202 is configured to emulate and estimate the phase current IL1 reaching 0, thereby switching the PWM signal Spw1 to the disable level DEL to turn off the high side switch QA and the low side switch QB of the power stage circuit 301[1]. The high side switch QA and the low side switch QB of the power stage circuits 301[2]~301[8] had already switched to the disable level DEL when entering single-phase switching earlier.

Figure 14:
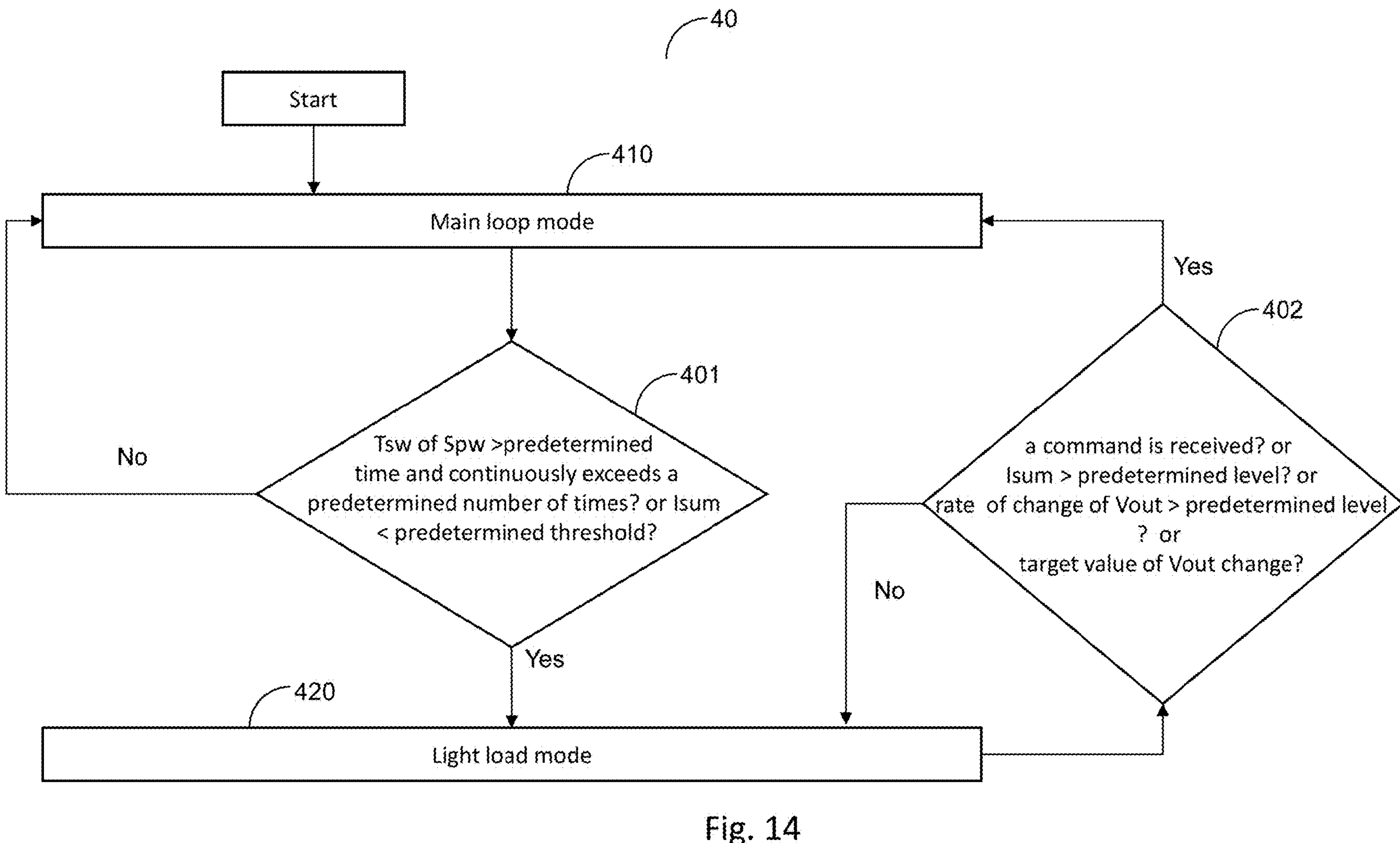
FIG. 14 shows a flowchart of the PWM control method according to one embodiment of the present invention.

FIG. 14 shows a flowchart of the PWM control method according to one embodiment of the present invention. As shown in FIG. 14, the PWM control method 40 of the present invention, after the power supply is activated (step start), first enters for example the main loop mode 410 for operation, performing main loop mode power conversion through the aforementioned main loop control circuit. Subsequently, step 401 is entered to determine whether the output current determined by summing all the corresponding current sensing signals Scs1~ScsN (i.e., the summed current-related signal Isum) has decreased to below a predetermined threshold or whether the switching period time Tsw of the PWM signals Spw1~SpwN exceeds a predetermined time for over the predetermined number of times. That is, it is determined by the switching period whether the load has decreased to a corresponding threshold. If either of the above determinations is true, i.e., the load has indeed decreased to the corresponding threshold, the PWM control circuit 20 switches from the main loop mode 410 to the light-load mode 420. If not, the PWM control circuit 20 continues to operate in the main loop mode for power conversion. The predetermined number of times is greater than or equal to 1.

Specifically, in the light-load mode 420, the light-load mode power conversion is performed through the aforementioned light-load loop control circuit. Subsequently, step 402 is entered to determine whether the PWM control circuit 20 needs to leave the light-load mode 420 and enter the main loop mode 410. In one embodiment, step 402 includes determining whether a command is received, or whether the output current of the power conversion circuit 30 (i.e., the summed current-related signal Isum) exceeds a predetermined level, or whether the rate of change of the output voltage Vout exceeds a predetermined level, or whether the target value Vref of the output voltage changes. If any of the above determinations is true, the PWM control circuit 20 switches from the light-load mode 420 to the main loop mode 410. If not, the PWM control circuit 20 continues to operate in the light-load mode for power conversion.

Figure 15:
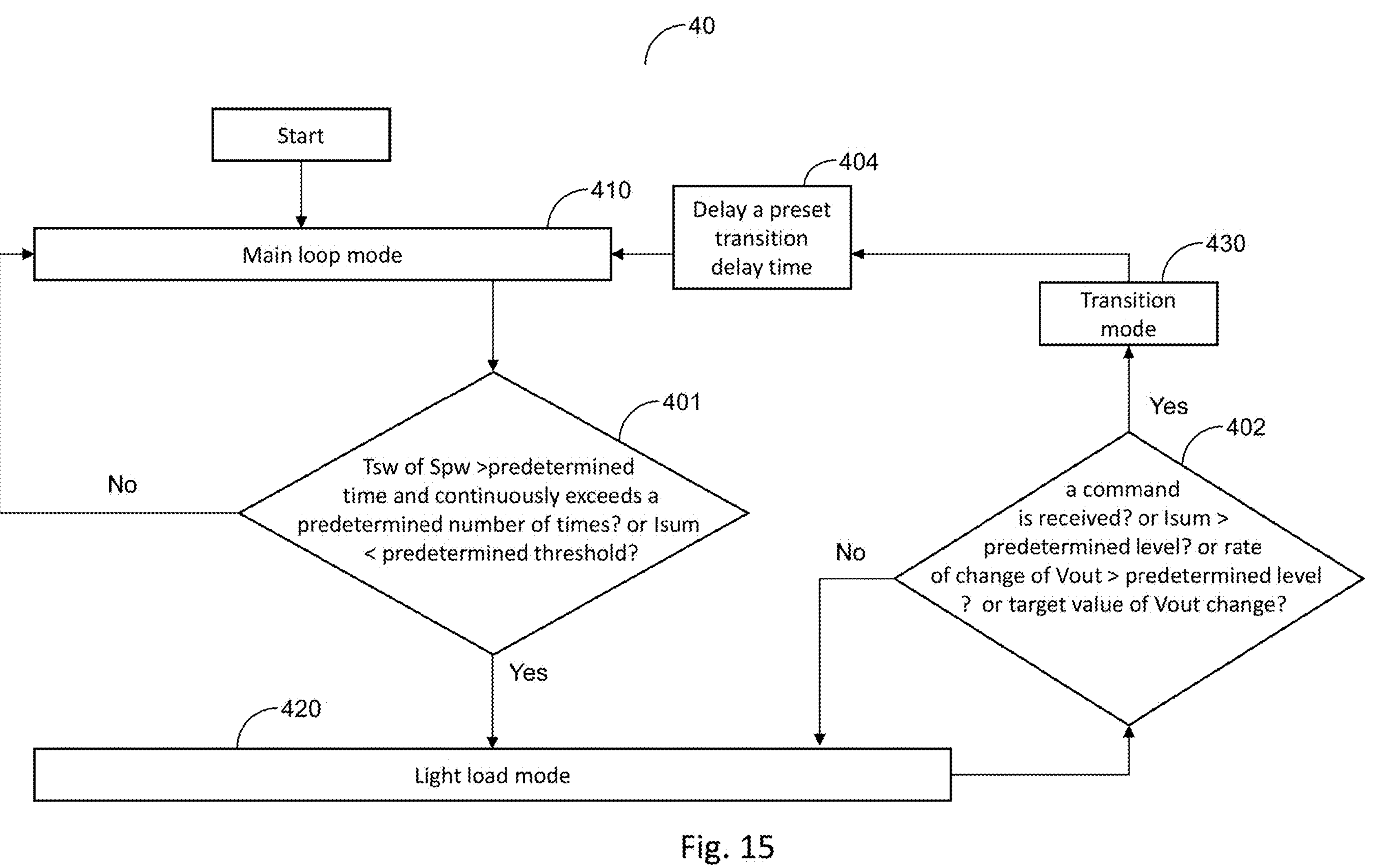
FIG. 15 shows a flowchart of the PWM control method according to another embodiment of the present invention.

FIG. 15 shows a flowchart of the PWM control method according to another embodiment of the present invention. This embodiment is similar to the embodiment of FIG. 14, with the difference that the PWM control method 40 of this embodiment further includes entering the transition mode 430 if the result of step 402 is true. In the transition mode 430, the aforementioned transition mode operation is performed for power conversion. Subsequently, in step 404, a predetermined transition delay time is applied to wait for the portion of the analog circuits in the main loop that had reduced current or stopped operation during the light-load mode to restart to the ready state, before entering the main loop mode 410.

Figure 16:
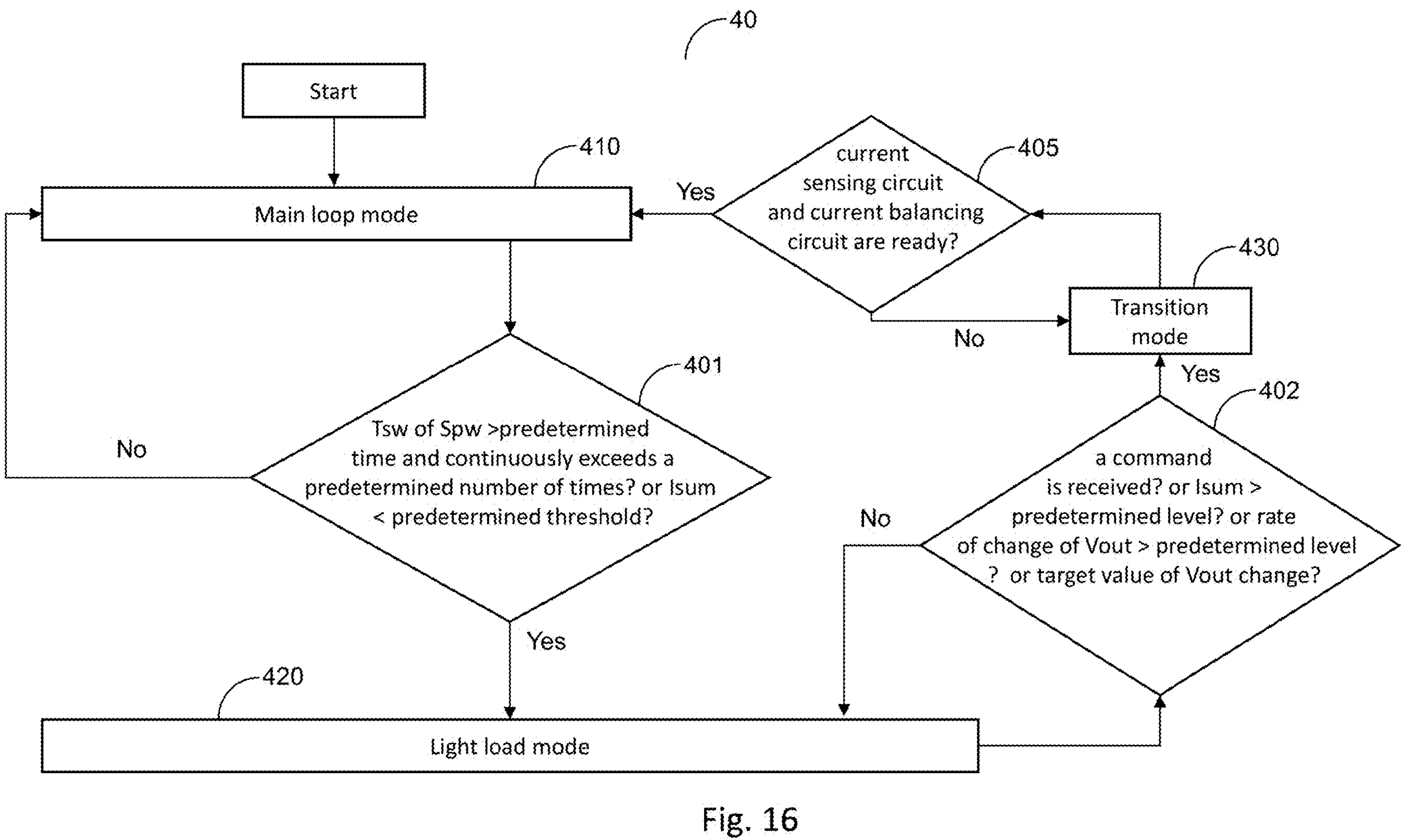
FIG. 16 shows a flowchart of the PWM control method according to yet another embodiment of the present invention.

FIG. 16 shows a flowchart of the PWM control method according to yet another embodiment of the present invention. This embodiment is similar to the embodiment of FIG. 15, with the difference that the PWM control method 40 of this embodiment replaces step 404 with step Specifically, step 405 determines whether the current sensing circuits and the current balancing circuit have entered a ready state. If yes, the main loop mode 410 is entered. If not, it returns to the transition mode 430.

In summary, the present invention proposes a dual-loop hybrid PWM control circuit that combines the advantages of the digital domain and the analog domain, reducing clock frequency and utilizing synthesized current to achieve low power consumption while maintaining high precision.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A pulse-width modulation (PWM) control circuit for controlling a power conversion circuit, wherein the power conversion circuit includes N power stage circuits, wherein N is an integer greater than or equal to 1, the PWM control circuit comprising:

a main loop control circuit; and a light-load loop control circuit;

wherein the main loop control circuit includes N current sensing circuits, wherein the N current sensing circuits are configured to sense N phase currents of the corresponding N power stage circuits to generate N corresponding current sensing signals, wherein the main loop control circuit is configured to generate N corresponding PWM signals in a main loop mode based on the N corresponding current sensing signals to respectively control duty ratios of the N power stage circuits;

wherein the light-load loop control circuit includes a current synthesis circuit configured to generate a synthesized current signal based on an input voltage, a target value of an output voltage, and an inductance value of an inductor in at least one of the N power stage circuits, wherein the light-load loop control circuit generates at least one corresponding PWM signal of the N PWM signals in a light-load mode based on the synthesized current signal to control the duty ratio of the corresponding power stage circuit;

wherein in the light-load mode, the main loop control circuit enters a power-saving state to reduce a power consumption of the PWM control circuit, wherein the power-saving state includes: reducing the power consumption of the N current sensing circuits or stopping an operation of the N current sensing circuits.

2. The PWM control circuit of claim 1, wherein the power consumption of the current synthesis circuit is less than that of the current sensing circuits.

3. The PWM control circuit of claim 1, wherein in the light-load mode, the synthesized current signal is configured to control the output voltage of the power conversion circuit such that the output voltage varies with a load current according to a predetermined load line.

4. The PWM control circuit of claim 1, wherein in a transition mode for switching from the light-load mode to the main loop mode, the main loop control circuit exits the power-saving state and replaces the corresponding current sensing signals with the synthesized current signal to generate the corresponding PWM signals.

5. The PWM control circuit of claim 1, wherein in the main loop mode, the N current sensing signals are configured to control the output voltage of the power conversion circuit such that the output voltage varies with a load current according to a predetermined load line.

6. The PWM control circuit of claim 1, wherein the main loop mode switches to the light-load mode based on any of the following conditions:

when an output current determined by summing all the corresponding N current sensing signals decreases to below a predetermined threshold; or when a switching period of the N PWM signals exceeds the predetermined time for over a predetermined number of times, wherein the PWM control circuit controls the power conversion circuit in a constant on-time control manner, and the predetermined number of times is greater than or equal to 1.

7. The PWM control circuit of claim 1, wherein in the light-load mode, the PWM control circuit switches from the light-load mode to the main loop mode based on any of the following conditions:

the PWM control circuit receives a command; or when an output current of the power conversion circuit exceeds a predetermined level;

when the target value of the output voltage changes; or when a rate of change of the output voltage exceeds a predetermined level.

8. The PWM control circuit of claim 4, further comprising:

a first analog-to-digital converter configured to convert an output voltage-related signal correlated with the output voltage into a digital output voltage-related signal in digital domain;

a second analog-to-digital converter configured to convert a summed current-related signal into a digital summed current-related signal in digital domain, wherein the summed current-related signal is a sum of the N current sensing signals; and N on-time generation circuits configured to time corresponding N constant on-times in analog domain according to triggering of corresponding N trigger signals to generate the corresponding N PWM signals, thereby reducing a frequency of at least one clock signal in the PWM control circuit;

wherein the main loop control circuit operates in digital domain based on a first clock signal in the main loop mode, wherein the main loop control circuit generates the N trigger signals based on the digital output voltage-related signal and the digital summed current-related signal;

wherein the at least one clock signal includes the first clock signal.

9. The PWM control circuit of claim 8, wherein by timing the N constant on-times in analog domain, the frequency of the first clock signal is reduced.

10. The PWM control circuit of claim 8, wherein the output voltage-related signal is a difference between the output voltage and the target value of the output voltage.

11. The PWM control circuit of claim 8, wherein end times of the N PWM signals are not synchronized with the first clock signal.

12. The PWM control circuit of claim 8, wherein the N current sensing circuits are configured to sense the corresponding N phase currents in analog domain to generate the corresponding N current sensing signals, thereby reducing the frequency of the at least one clock signal.

13. The PWM control circuit of claim 8, wherein N is an integer greater than or equal to 2, wherein the main loop control circuit further includes:

a current balancing circuit operating in analog domain, wherein the current balancing circuit is configured to respectively generate corresponding N current balancing signals based on differences between an average value of the summed current-related signal and the N current sensing signals, wherein the N current balancing signals are configured to respectively adjust the corresponding N constant on-times to achieve current balancing among the corresponding N phase currents, thereby reducing the frequency of the at least one clock signal;

wherein the power-saving state further includes: reducing the power consumption of the current balancing circuit or stopping the operation of the current balancing circuit.

14. The PWM control circuit of claim 4, wherein the transition mode is exited and the main loop mode is entered based on any of the following conditions:

after delaying a predetermined transition delay time; or when it is determined that the N current sensing circuits and the current balancing circuit have entered a ready state.

15. The PWM control circuit of claim 8, wherein the light-load loop control circuit further includes a light-load trigger circuit; wherein the synthesized current signal includes a first synthesized current signal; in the light-load mode, the current synthesis circuit generates the first synthesized current signal in digital domain, based on a second clock signal, according to at least one of the N constant on-times, and the light-load trigger circuit generates the corresponding trigger signal in digital domain based on the second clock signal according to the digital output voltage-related signal and the first synthesized current signal;

wherein the at least one clock signal includes the second clock signal.

16. The PWM control circuit of claim 15, wherein a frequency of the second clock signal is lower than that of the first clock signal, thereby reducing the power consumption of the PWM control circuit in the power-saving state.

17. The PWM control circuit of claim 8, wherein the synthesized current signal further includes a second synthesized current signal; wherein in the transition mode, the current synthesis circuit generates the second synthesized current signal in digital domain based on the first clock signal, and in the transition mode, the main loop control circuit generates the N trigger signals, based on the first clock signal, according to the digital output voltage-related signal and the second synthesized current signal replacing the digital summed current-related signal.

18. The PWM control circuit of claim 17, wherein the second synthesized current signal is updated based on a period of the first clock signal to emulate the corresponding N phase currents in real time or emulate the sum of the N current sensing signals in real time.

19. The PWM control circuit of claim 17, wherein N is an integer greater than or equal to 2, and the second synthesized current signal includes corresponding N sub-synthesized current signals, wherein the main loop control circuit includes a second current balancing circuit, wherein the second current balancing circuit operates in digital domain and is configured to respectively generate corresponding N current balancing signals based on differences between an average value of a sum of the second synthesized current signals and the N sub-synthesized current signals in digital domain in the transition mode, wherein the N current balancing signals are configured to adjust the corresponding N constant on-times to achieve current balancing among the corresponding N phase currents.

20. The PWM control circuit of claim 15, wherein the first synthesized current signal is updated based on a period of the second clock signal to emulate an average value of the corresponding phase current.

21. The PWM control circuit of claim 1, wherein the power-saving state further includes: reducing the power consumption of a main trigger circuit of the main loop control circuit or stopping the operation of the main trigger circuit, wherein the main trigger circuit is configured to generate the N trigger signals.

22. A pulse-width modulation (PWM) control circuit for controlling a power conversion circuit, wherein the power conversion circuit includes N power stage circuits, wherein N is an integer greater than or equal to 1, the PWM control circuit comprising:

a loop control circuit;

a first analog-to-digital converter configured to convert an output voltage-related signal correlated with an output voltage into a digital output voltage-related signal in digital domain;

a second analog-to-digital converter configured to convert a summed current-related signal into a digital summed current-related signal in digital domain, wherein the summed current-related signal is a sum of N current sensing signals; and N on-time generation circuits configured to time corresponding N constant on-times in analog domain according to triggering of corresponding N trigger signals to generate corresponding N PWM signals, thereby reducing a frequency of at least one clock signal in the PWM control circuit;

wherein the loop control circuit includes N current sensing circuits and a digital trigger circuit, wherein the N current sensing circuits are configured to sense N phase currents of the corresponding N power stage circuits to generate the corresponding N current sensing signals, wherein the loop control circuit generates the corresponding N PWM signals based on the corresponding N current sensing signals to respectively control duty ratios of the N power stage circuits; wherein the digital trigger circuit generates the N trigger signals in digital domain, based on a first clock signal, according to the digital output voltage-related signal and the digital summed current-related signal;

wherein the at least one clock signal includes the first clock signal.

23. The PWM control circuit of claim 22, wherein end times of the PWM signals are not synchronized with the first clock signal.

24. The PWM control circuit of claim 22, wherein the N current sensing circuits are configured to sense the corresponding N phase currents in analog domain to generate the corresponding N current sensing signals, thereby reducing the frequency of the at least one clock signal.

25. The PWM control circuit of claim 22, wherein N is an integer greater than or equal to 2, wherein the loop control circuit further includes:

a current balancing circuit operating in analog domain, wherein the current balancing circuit respectively generates corresponding N current balancing signals based on differences between an average value of the summed current-related signal and the N current sensing signals, wherein the N current balancing signals are configured to adjust the corresponding N constant on-times to achieve current balancing among the corresponding N phase currents, thereby reducing the frequency of the at least one clock signal.

* * * * *